United States Patent [19]

Goetsch et al.

[11] 4,100,793

[45] Jul. 18, 1978

[54] AIR/FUEL REGULATOR DIAGNOSTICS FOR INTERNAL COMBUSTION ENGINE

[75] Inventors: Henry E. Goetsch, Windsor, Conn.; James A. Cook, Agawam, Mass.; Lee R. Armstrong, Enfield, Conn.

[73] Assignee: United Technologies Corporation, Hartford, Conn.

[21] Appl. No.: 781,092

[22] Filed: Mar. 25, 1977

[51] Int. Cl.² .................................... G01M 15/00
[52] U.S. Cl. .................................................. 73/118
[58] Field of Search ................. 73/117.3, 116, 119 A, 73/118

[56] References Cited

U.S. PATENT DOCUMENTS

| | | | |
|---|---|---|---|
| 3,636,703 | 1/1972 | Dileski | 73/117.2 |
| 4,037,575 | 7/1977 | Sommars | 123/140 MC |

Primary Examiner—Jerry W. Myracle

Attorney, Agent, or Firm—M. P. Williams

[57] ABSTRACT

The average of two horsepower measurements utilizing an empirically-determined horsepower constant, made with electronic diagnostic equipment employing engine transducers, during three successive acceleration bursts from a low engine speed to a high engine speed with the air/fuel ratio regulator defeated so as to provide full fuel, is compared against the average of two additional such horsepower measurements made in three additional acceleration bursts which are underfueled due to feeding the air/fuel regulator with atmospheric air; the horsepower difference is a measure of the action of the air/fuel regulator; one burst of each set simply purges air accumulations in the fuel lines, if any. If desired, indications of horsepower may be calculated without an inertia constant, since the measurements herein are comparative.

6 Claims, 4 Drawing Figures

AIR/FUEL REGULATOR DIAGNOSTICS FOR INTERNAL COMBUSTION ENGINE

CROSS REFERENCE TO RELATED APPLICATIONS

The disclosure herein utilizes horsepower measurements of the type disclosed in a commonly owned, copending application, Ser. No. 747,759, ENGINE AIR-IN-FUEL DIAGNOSTICS, filed on Dec. 6, 1976 by Armstrong and Mercik. The apparatus disclosed herein may utilize a cylinder identification centering means disclosed and claimed in a commonly owned, copending application, Ser. No. 684,221, now U.S. Pat. No. 4,043,189 ENGINE, CYLINDER IDENTIFICATION (CID) TRANSDUCER, filed on May 7, 1976 by Tedeschi, and may determine the number of teeth on a flywheel for speed measurements in accordance with a commonly owned, copending application, Ser. No. 684,037, now U.S. Pat. No. 4,015,466 DETERMINATION OF NUMBER OF TEETH ON AN INTERNAL COMBUSTION ENGINE FLYWHEEL, filed on May 7, 1976 by Stick et al., or Ser. No. 747,755, WAVEFORM COUNT OF TEETH ON AN INTERNAL COMBUSTION ENGINE FLYWHEEL, filed on December 6, 1976 by Pettingell et al.

FIELD OF ART

This invention relates to engine diagnostics and more particularly to measuring the effective operation of the air/fuel ratio regulator of an internal combustion engine.

BACKGROUND OF THE INVENTION

In the fuel system of internal combustion engines, particularly diesel engines, one type of fuel system utilizes a fuel pump in which a valve connected to the throttle linkage determines the amount of fuel to be distributed by the pump to the fuel injectors of the engine. The throttle linkage is limited in its effect on the fuel valve by means of a governor which, through the action of centrifugally actuated flyweights or the like, limits the amount of fuel at higher speeds so that the engine will not exceed rated speed at rated power, nor will it exceed a high idle speed when the engine is unloaded. The throttle linkage is also limited in its effect on the fuel valve by an air/fuel ratio regulator which is connected to the engine air inlet manifold, and typically contains a bellows or diaphragm responsive to the pressure of air in the air inlet manifold so as to limit the amount of fuel applied to the engine to an amount which can be efficiently consumed with air supplied at the pressure in the air inlet manifold. Thus, as an engine starts to accelerate, the turbocharger has not built up full operating pressure in the air inlet manifold, so that the engine cannot efficiently utilize all of the fuel being called for by the throttle linkage; this lower pressure is sensed in the air/fuel regulator and limits the amount of fuel to be supplied to the engine. But as the engine builds up speed, the turbocharger compresses the inlet air to the desired operating pressure so that operation of the engine with the full fuel commanded for it will not be in an overfueled condition.

A typical air/fuel ratio regulator may have an extension of on the order of 50 mils between atmospheric pressure and maximum air intake manifold pressure; this will provide a commensurate control over a total throttle linkage travel of on the order of 300 mils. Typically, the air/fuel regulator will allow full fuel flow for air intake manifold pressures in excess of 18 psi, and provide a commensurate reduction therein for lower pressures.

One manner of testing the operation of the air/fuel regulator is to simply measure the extent of traverse thereof (in its effect on the throttle linkage) as a consequence of being connected to atmospheric pressure or to a known regulated pressure (such as shop air) which is in excess of its design (maximum-fuel) pressure (such as 18 psi). However, the measurement of such small distances (a portion of the 50 mils of its maximum travel) in other than a bench test environment is extremely impractical; and removal of the device for test is an undue burden and expense, and can result in creating other engine problems through mechanics errors and the like. To measure this travel electronically while the air/fuel ratio regulator is mounted on the engine would require the use of a precise linear motion transducer, such as the well known linear variable differential transformer (LVDT); however, such devices are not readily adapted for use in rugged environments and are otherwise unsuited to this purpose. And the cost and time, added to the test burden by the mounting of such a transducer, is to be avoided.

SUMMARY OF THE INVENTION

Objects of this invention include improved measurement of the operational effect of an air/fuel ratio regulator in an internal combustion engine, and on-engine measurement of air/fuel ratio regulator operation without the need of a precise linear displacement transducer.

According to the present invention, a measure of the horsepower developed by the engine when operating in a full fuel condition in an unloaded acceleration burst is compared with a measure of the horsepower developed by the engine when operating in a fuel-limited, unloaded acceleration burst, and the difference in the measured horsepower is taken as a measurement of the effective operation of the air/fuel ratio regulator of the engine. In accordance with the invention still further, the average horsepower developed by the engine in plural full fuel acceleration burst is compared against the average horsepower developed by the engine in plural fuel-limited bursts to provide a measure of the operating condition of the air/fuel ratio regulator of the engine.

The invention provides a simple, on-engine measurement of the operation of an air/fuel ratio regulator, without the need of a precision linear motion transducer. The invention may be practiced in an electronic diagnostic system which provides significant other diagnostic procedures as well, or in any other suitable fashion. The invention is readily implemented in technologies which are widely available.

The foregoing and other objects, features and advantages of the present invention will become more apparent in the light of the following detailed description of exemplary embodiments thereof, as illustrated in the accompanying drawing.

DETAILED DESCRIPTION

Figure 1:
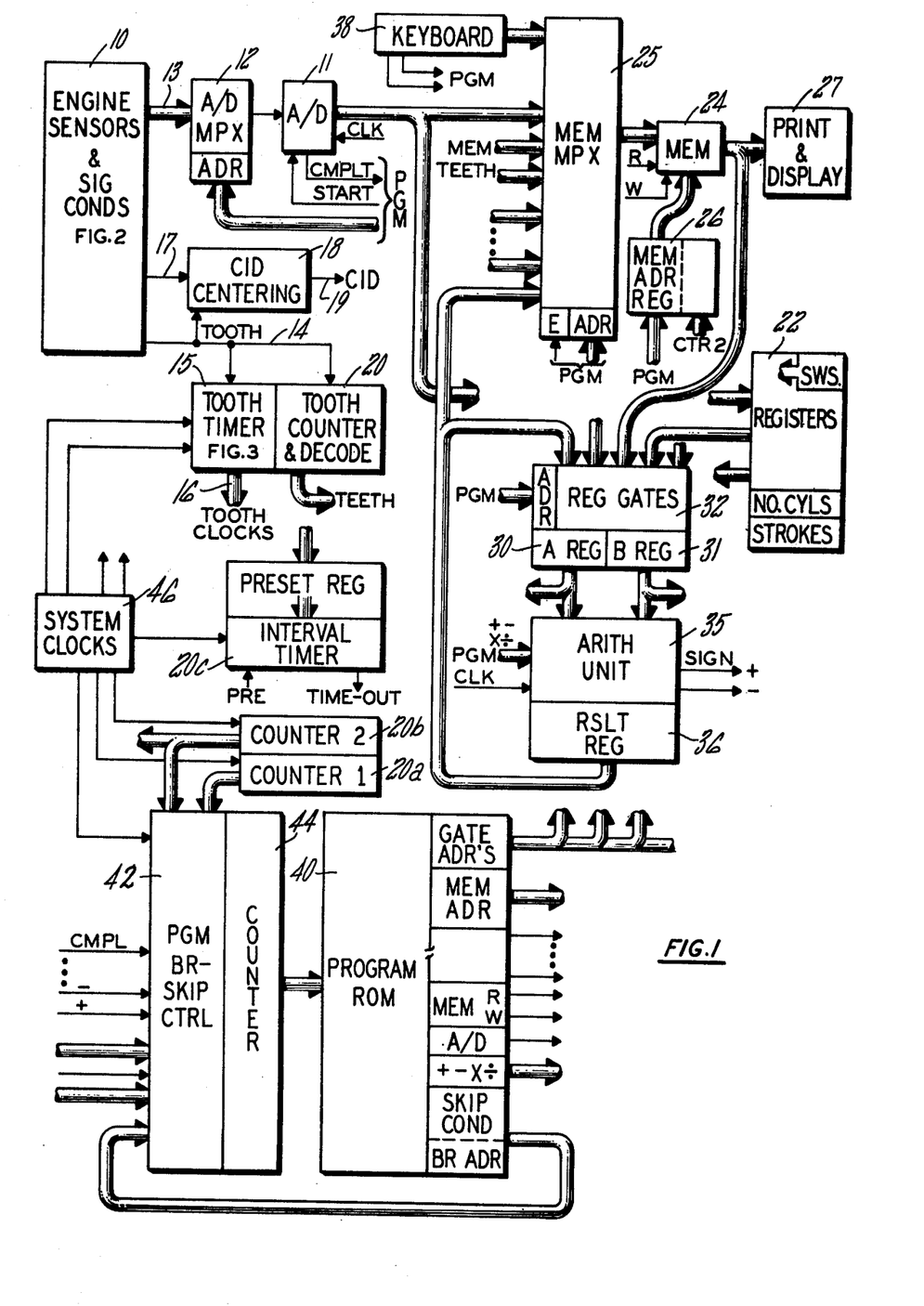
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a useful fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs of the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected from processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
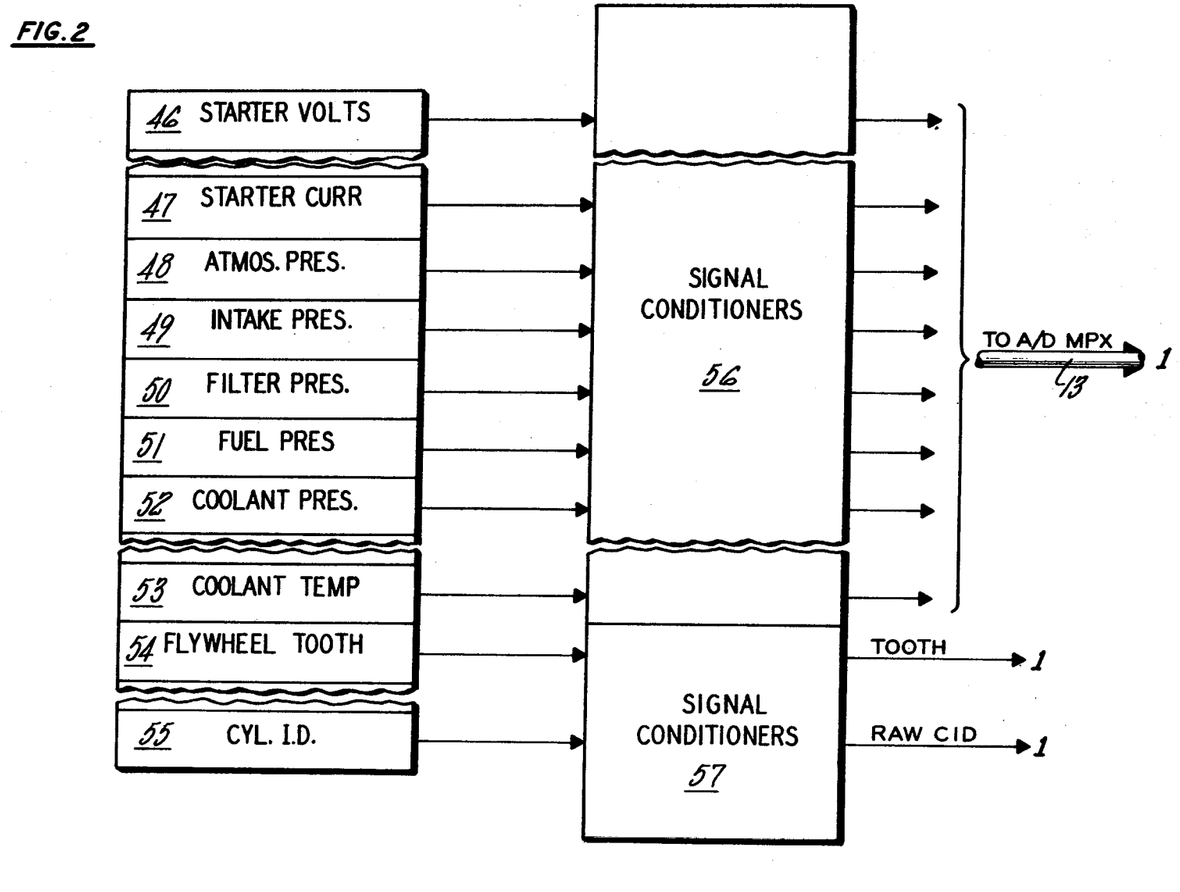
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
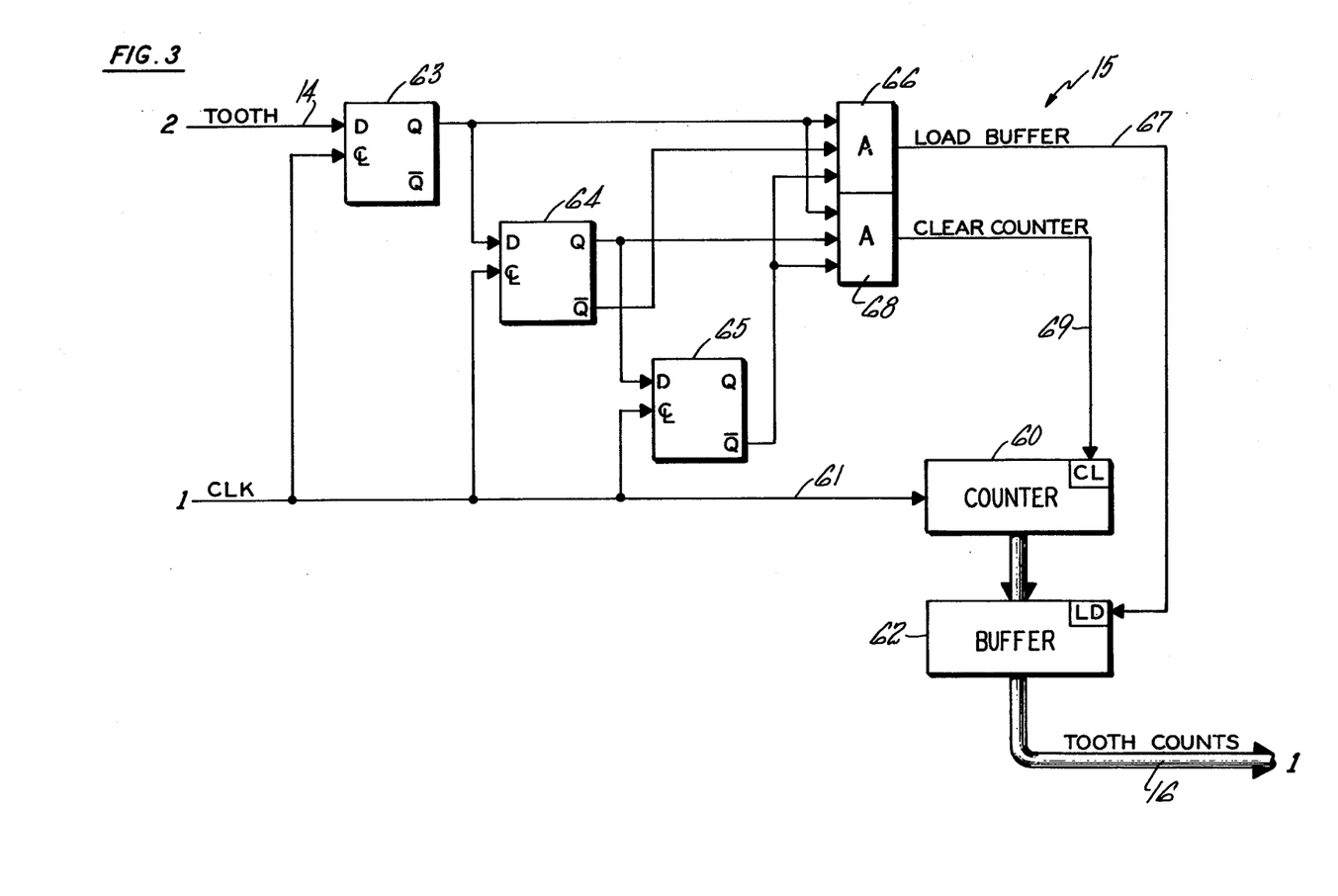
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type filp flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63-65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth," a stored factor indicating the number of teeth on the flywheel of the engine under test. This may be determined and entered from engine specification, or as set forth in a commonly owned copending application of Stick et al., Ser. No. 684,037, now U.S. Pat. No. 4,015,466 entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM," such as "(Freq)" indicate addresses, chosen at will by the programmer, or partially determined by counter two, if so indicated.

Figure 4:
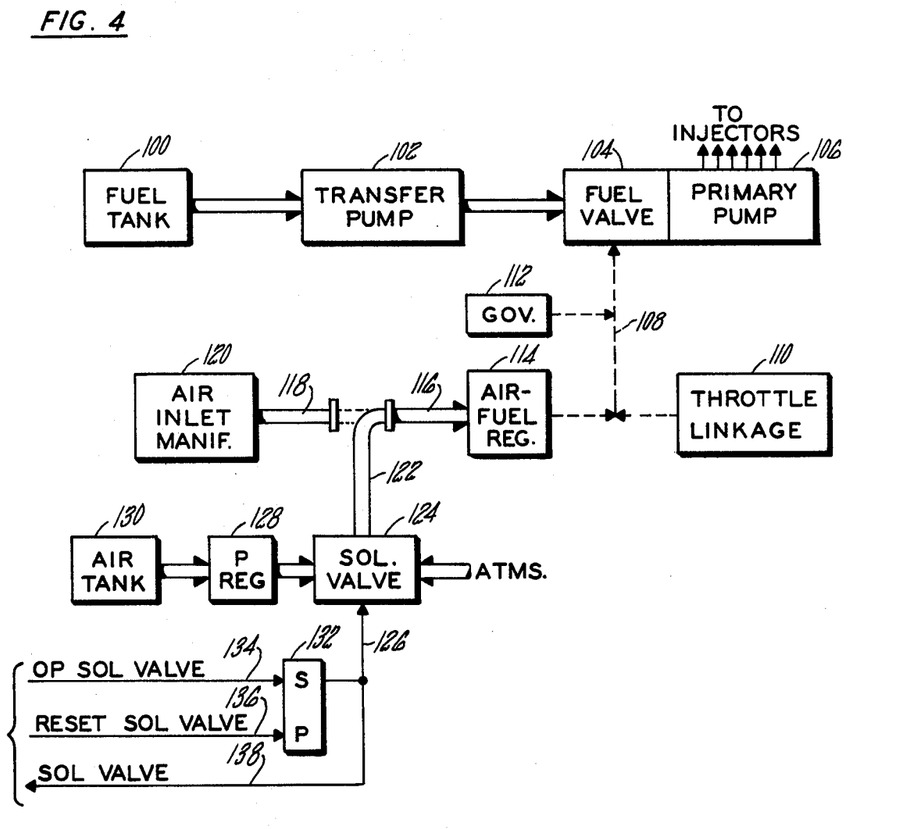
FIG. 4 is a simplified schematic block illustration of a fuel system in an engine with apparatus to force the air/fuel ratio regulator for full fuel operation or underfuel operation in accordance with the invention.

Referring now to FIG. 4, there is shown a simplified, block illustration of an engine fitted out for an air/fuel ratio regulator measurement in accordance with the present invention. FIG. 4 illustrates a typical vehicle mounted diesel engine which includes a fuel tank 100 feeding a transfer pump 102 which in turn feeds the fuel valve portion 104 of a primary pump 106. The primary pump 106 serves as both a pressure determining and time determining distributing pump for providing fuel to the individual injectors related to the various cylinders of the engine. The amount of fuel which the primary pump 106 will accept for transfer to the fuel injectors is determined by the fuel valve 104, which is in turn connected to a variety of linkage means 108. The linkage means 108 is connected in a well known fashion to throttle linkage 110 so as to permit control of engine fuel by means of an accelerator pedal or the like. But this linkage has limits on it, which are provided by a governor 112 and an air/fuel regulator 114. The governor 112 has centrifugally positioned rotating flyweights or the like which, near rated engine speed, prevent additional advancement of the linkage 108 so as to limit the fuel supply to the engine to that which will cause the engine to operate at rated speed when it is loaded at rated power, or to high idle speed when unloaded.

The air/fuel regulator 114 is normally connected by suitable duct means 116, 118 to the air inlet manifold 120 of the engine. In normal operation, if the air pressure is low in the air inlet manifold 120, a diaphragm, bellows, or the like in the air-fuel regulator will move the linkage 108 in a direction so as to reduce the amount of fuel which the valve 104 provides to the engine. This action is designed to avoid overfueling which results in lugging, smoking, and fuel waste. On the other hand, when the turbocharger or other inlet air pressurizing device provides air at suitably high pressure to the air inlet manifold 120, the diaphragm in the air-fuel regulator 114 allows the linkage 108 to provide a full flow of fuel, subject to the operation of the throttle linkage 110 and the governor 112.

For the measurement to be made therein, at least one full fuel acceleration and at least one fuel-limited acceleration of the engine, under the control of the air-fuel regulator 114, is required in order to provide a measure of the air-fuel regulator operation. To this end, preparatory to performing the measurement in accordance with the present invention, the ducting 16, 18 is broken and a test duct 122 connects the air-fuel regulator duct 116 to a solenoid valve 124. The solenoid valve, when in a rest position, allows atmospheric air to communicate with the air-fuel regulator 114, thus causing the air-fuel regulator to limit the operation of the linkage 108 so as to limit the fuel to the engine. But when the solenoid valve 124 is operated, such as by a signal on a line 126, the test duct 122 is connected by the solenoid valve 124 is a pressure regulator 128, which in turn is connected to a suitable source of air pressure 130 which may comprise shop air or the brake air tank of the vehicle in which the engine is mounted. The pressure regulator 128 may typically adjust the pressure to on the order of 22 psig, which is in excess of the rated pressure at the inlet manifold 120 for which the air-fuel regulator will permit full fuel flow. The signal on the line 126 may be provided by a bistable device 132, which is set by a signal on an addressable line 134 and reset by a signal on an addressable line 136. The line 126 is also addressable to indicate the status of the bi-stable device 132 and the solenoid valve 124, by a signal indicating the valve is operated.

As the pressure varies from atmospheric to full, rated pressure at the air inlet manifold, the motion of the linkage 108 in response to the diaphragm or bellows in the air-fuel regulator will vary by only 50 mils or so; it is for this reason that use of a linear motion transducer is difficult since such a transducer would have to be extremely accurate, such as a linear variable differential transformer or the like, which is not readily available in a form suitable for reliable use in a rugged shop environment. And, mounting such transducer on each engine to be tested adds cost and time. One aspect of the present invention is avoiding the need for such a transducer in measuring the effect of the air-fuel regulator 114 and moving the linkage means 108.

In order to make the horsepower measurements, the description of exemplary operation of typical processing apparatus given hereinafter follows the measurements set forth in the aforementioned Armstrong and Mercik application, in three successive overfueled acceleration bursts and three underfueled bursts (for example only), and a comparison of the results thereof. In the following description, it is assumed that the display apparatus is capable of indicating that the operator should allow the engine to idle at low speed by means of displaying a "Lo spd" indication, and that he should advance the throttle to a high speed by displaying a "Hi spd" indication. This is not necessary for performance of the air-fuel regulator measurement according to the present invention, however, it can be very convenient when the air-fuel regulator test is interleaved between other tests so that the operator can synchronize throttle operation of the engine with the workings of the processor.

As described briefly hereinbefore, it is assumed that factors which are needed are stored in memory locations for which the factors are known, or are stored in the fixed registers 22 which are set aside therefore; in either event, the programmer can insert the proper instruction so as to reach factors which are necessary. For instance, as is described briefly hereinbefore, for any given engine under test, an empirical constant that relates torque and speed to horsepower may have previously been determined and entered into the system in a well known fashion. This may be entered through the keyboard either to fixed registers or to a suitable address in memory in accordance with the desires of the programmer and the characteristics of the given processing apparatus which may be utilized to implement the present invention. Similarly, factors such as "2" (to provide averages) may similarly be stored in suitable portions of memory or in suitable ones of the working registers 22.

The speed measurements herein are made by the tooth timer 15, which senses the passage of teeth and records a count of the number of clock signals fed to the tooth timer on a tooth-to-tooth basis. The fraction of a revolution traversed as each tooth passes the sensor is simply the ratio of one divided by the total number of teeth. The number of teeth on the flywheel may be determined by any suitable method, some of which are disclosed in the afore-mentioned applications of Stick et al and of Pettingell et al; or engine specifications may provide the number of flywheel teeth (RGT). The time for that fraction of a revolution to occur is simply the counts of the tooth timer 15 divided by the frequency of clock signals fed to the tooth timer 15. Since the frequency of the clock feeding the timer is expressed in Hz, and speed is normally expressed in revolutions per minute, a factor of 60 must be employed in a well known fashion. To actually determine the speed from the counts provided by the tooth timer 15, the relationship is the ratio of one tooth to the total number of teeth, which is divided by the ratio of the counts to the frequency (the frequency in turn having to be first divided by 60 to yield a result in rpm's). Rewritten, this results in the frequency of the clock times 60, all of which is divided by the total number of flywheel teeth times the counts from the tooth timer in the tooth counter. This may be predetermined as a speed factor (so that any time a speed reading is required, it can be taken simply by dividing the speed factor by the number of counts in the timer) according to the following instructions:

1. Load MEM (Freq) to A REG
2. Load MEM (RGT) to B REG
3. Divide
4. Load RSLT to A REG
5. Load 60 Factor to B REG
6. Multiply
7. Load RSLT to MEM (Spd Factor)

At the start of the air-fuel regulator measurements described hereinafter, it is well to ensure that both counters 1 and 2 are reset, and to ensure that the operator allows the engine to reach a low speed so that the computer will thereafter by monitoring speed as it is increasing during acceleration bursts. Also, if the first bursts are to be full fuel bursts, the solenoid valve 124 must be operated. Thus, the initializing instructions may be as follows:

8. Op Sol Valve
9. Reset Counter 2
10. Reset Counter 1
11. Display "Lo Spd"

When comparing the actual speed of the engine as determined by the tooth timer with predetermined speeds (such as a starting speed for horsepower measurement), one can reverse the position of speed and counts in the relationships described hereinbefore and determine in advance the number of counts which the tooth timer will have when the engine has a predetermined speed. This is done generally by multiplying the frequency of the clock times 60, all of which is divided by the product of the total number of teeth on the flywheel and the desired starting speed in rpm. This can be accomplished in the exemplary diagnostic system of FIG. 1 with the following instructions:

12. Load MEM (Freq) to A REG
13. Load MEM (RGT) to B REG
14. Divide
15. Load RSLT to A REG
16. Load MEM (Lo Idle Spd) to B REG
17. Divide
18. Load RSLT to B REG
19. Load 60 Factor to A REG
20. Multiply
21. Load RSLT to A REG Then the system can simply monitor the tooth timer counts, continuously subtracting the predetermined counts from the tooth timer counts. Since counts are larger for a lesser speed, if the speed of the engine is below a predetermined speed (such as low idle, about 700 RPM), then the predetermined counts will be less than the tooth timer counts and this can be determined by doing a subtract and looking for a negative result as set forth in the following instructions:

22. Load Tooth timer to B REG
23. Subtract
24. Skip 1 if −
25. Branch to 22
26. Display Hi The system having determined that the engine is at low idle, it has, in instruction 26, commanded the operator to accelerate the engine to high idle. Speed factors are again brought out so as to be able to sense a starting speed in excess of low idle, which may for instance, be on the order of 1000 RPM. This may be done, in a fashion similar to that described with respect to instructions 12–26, as follows:

27. Load MEM (Freq) to A REG
28. Load MEM (RGT) to B REG
29. Divide
30. Load RSLT to A REG
31. Load MEM (Start Spd) to B REG
32. Divide
33. Load RSLT to A REG
34. Load 60 Factor to B REG
35. Multiply
36. Load RSLT to B REG
37. Load Tooth timer to A REG
38. Substract; Skip one if −
39. Branch to 37

In the exemplary embodiment of the present invention, six cycles of acceleration are monitored, the precise starting of each of the six cycles being indicated by the presence of a CID signal after sensing the starting speed. After the first CID signal, speed is instantaneously read and an interval timer is stated; then three CID signals are allowed to pass, and after the fourth CID signal, speed is again instantaneously read and the interval timer is stopped. This may be accomplished herein according to the following pattern of exemplary instructions.

40. Skip one if CID
41. Branch to 40
42. Load Tooth timer to MEM (first Spd)
43. Start Interval timer
44. Skip one of CID
45. Branch to 44
46. Advance Counter 1 47. Skip 1 if Counter 1 = 3
48. Branch to 44
49. Skip one if CID
50. Branch to 49

51. Load Tooth timer to MEM (second Spd)
52. Stop Interval timer
53. Load Interval timer to MEM (time)

At this point in time, information which is very accurate has been derived and stored in memory relative to the first and second speeds and the time interval between them.

Since the information required for the determination of horsepower during the first acceleration burst has been acquired by the processor, the processor may now indicate to the operator that he can allow the engine to return to a low speed, and then operate on the data which has been acquired to provide an indication of horsepower during the first burst while the engine is decelerating to a low speed, as set forth in the next-following instructions. On the other hand, of course, in any given implementation of the present invention, all the calculations could be performed after all of the data had been acquired, although a slightly larger amount of storage space would be utilized in such a case. Since speed is determined by the speed factor of instructions 5–11 divided by the counts sensed in the tooth timer, subtracting of the counts and then combination with the factor would be erroneous; instead, speed must be converted first to rpm and then a subtraction made. Thus determination of speed in rpm's may be in accordance with the following instructions:

54. Display Lo Spd
55. Load MEM (first Spd) to B REG
56. Load MEM (Spd Factor) to A REG
57. Divide
58. Load RSLT to MEM (first Spd)
59. Load MEM (second Spd) to B REG
60. Divide
61. Load RSLT to A REG
62. Load MEM (first Spd) to B REG
63. Subtract
64. Load RSLT to MEM (Spd Difference)

Thus the exemplary embodiment herein uses precise cyclic measurements of the CID signal together with precise subcyclic measurements of speed to provide a very accurate indication of the relationship between speed and time over an interval of an acceleration profile of an engine, the interval being related directly to its sub-cyclic fluctuations by the CID signal, whereby much more accurate information as to speed and time interval is made available, for use in the horsepower comparisons of the invention.

In order to determine the indications of horsepower, an indication of acceleration is required. This is the speed difference of instruction 64 divided by the time which lapsed during the burst, which is indicated by the interval timer word loaded into memory by instruction 53. And, as is known, torque is equal to the product of inertia and acceleration; in this embodiment, inertia is accommodated in an empirical way in a constant, which is a well-known method and not part of the invention. Then; horsepower is the product of torque and speed. Speed is taken as the average speed during the acceleration burst, which is therefore one half of the sum of the first and second speeds determined in instructions 55–60 hereinbefore. But the one half factor can also be accommodated in the constant, if desired, to simplify the calculations each time that the test is performed by the processing equipment. Thus the next step in determining horsepower is to add the two speeds which were determined in instructions 57 and 60; these two speeds will reside in the A register and B register; respectively, so that a simple addition will provide a factor proportional to the average speed during the burst. Then this need be multiplied by the speed difference determined in instruction 64 and divided by the time which is a known constant variable of the interval timer word; and finally, multiplied by the constant. This may therefore be in accordance with the following instructions:

65. Add
66. Load RSLT to A REG

Thus, speed is now available in the A register.

67. Load MEM (Spd Difference) to B REG
68. Multiply
69. Load RSLT to A REG

At this point, the product of the speed difference and the average speed is in the A register.

70. Load MEM (time) to B REG
71. Divide
72. Load RSLT to A REG

The A register now contains the product of the speed difference at either end of the burst and the average speed during the burst, divided by the time of the burst across which the speed measurements were made. All that remains is to multiply by the horsepower constant (which is empirically determined as described hereinbefore) and store the results. And, counter 2 is used to keep track of the three bursts of horsepower readings to be averaged together.

73. Load MEM (H.P. Constant) to B REG
74. Multiply
75. Advance Ctr 2
76. Skip 2 if Ctr 2 = 3
77. Load RSLT to MEM (H.P. - Ctr 2)
78. Branch to 10

In the case of the first and second bursts, the horsepower measurements are stored away in memory and the program banches back to instruction 10 to repeat the process again. However, once counter 2 is set to three and the horsepower has been determined in instruction 74, instruction 76 causes the program to skip over the loading of the result to memory and the branching back to the beginning of the program, so that the average of the second and third bursts can be made. The first burst is ignored, since air in the fuel line could give a faulty horsepower reading; the first burst just purges the fuel lines of air accumulations. If desired, the processing may be altered so as not to even measure speed and time in the first burst of each set. The last two results may be added and divided by two so as to provide an average horsepower for the second two bursts, as follows:

79. Load RSLT to A REG
80. Reset Counter 2
80a. Advance Counter 2
81. Advance Counter 2
82. Load MEM (H.P - Ctr 2) to B REG
83. Add
84. Load RSLT to A REG
85. Advance Counter 2
86. Load MEM (H.P. - Ctr 2) to B REG
87. Add
88. Load RSLT to A REG
89. Load 2 Factor to B REG
90. Divide After instruction 90 there is now in the result register the average of two horsepower readings taken in the second two of three successive bursts. If these are the first three bursts, then three more bursts are required, with the solenoid valve off. But if these are the second set of three bursts, then all that needs be done is to substract the second average of the second three bursts from the first average of the first three bursts. Determination of whether this is the first set of three or the second set of three can be made by utilizing the bistable device 132 as a flag which is initially set, and which is reset at the end of the first three bursts. Completion of the first and second horsepower measurements in each set causes branching to instruction 10 so as not to reset counter 2; but completion of the first set of three bursts causes branching to instruction 9 so that counter 2 is also reset.

After resetting the solenoid valve, the process is repeated for three acceleration bursts, and then the second average horsepower reading of two bursts is subtracted from the first average horsepower reading, and the results are displayed, which provides a competent measure of the air/fuel ratio regulator operation; but, the results may also be stored in memory for use in further diagnostic procedures, if desired, which form no part of the present invention. Instructions for wrapping up the first and second sets of three bursts for two horsepower measurements each, may be as follows:

91. Skip one if Sol Valve
92. Branch to 96
93. Load RSLT to MEM (H.P. 1)
94. Reset Sol Valve
95. Branch to 9
96. Load RSLT to B REG
97. Load MEM (H.P. 1) to A REG
98. Subtract
99. Load RSLT to MEM
100. Load RSLT to DISPLAY Thus, the foregoing processing during at least two successive acceleration bursts, one with full fuel and one fuel-limited, provide the most dynamic indication of effective air/fuel ratio regulator operation, since the acceleration bursts are made with maximum fuel demand (full throttle), and the horsepower measurements are made during the acceleration, before the governor cuts in to limit the fuel. If desired, only one full fuel acceleration and one fuel-limited acceleration need be made, particularly if the test is mandated to follow a test which has identified whether or not there is air in the fuel. And there is no need to average two full fuel horsepower measurements and two fuel-limited measurements, if not desired in any implementation of the invention; or, more measurements could be made averaged if desired. And the full-fuel and fuel-limited measurements could be reversed in order or even done in an interleaved fashion, so long as the results were properly allocated and averaged, if desired. The horsepower measurements herein need not be made in any particular fashion, so long as they are indicative of actual engine operation characteristics; for instance, the horsepower measurements could be made in any fashion known in the art, such as that disclosed in commonly owned patent of Armstrong, U.S. Pat. No. 4,015,467. The solenoid valve could be arranged to connect between a high pressure source and the air intake manifold, since during a single acceleration burst, the air provided to the air/fuel ratio regulator by the air intake manifold hardly exceeds atmospheric, particularly at the point of horsepower measurements in the test herein. Similarly, the solenoid could be arranged to operate with a signal so as to supply the low pressure air (reverse from the manner shown herein). So long as there are means to control the forcing of the full fuel condition and the fuel-limited condition, it is not material how that is implemented; although it is most convenient to have it done automatically, in response to the processing apparatus as described herein, it could also be done manually so long as the operator keeps track of the accelerations and the meaning of the horsepower readings taken therein: in fact, this may be more attractive in a portable diagnostic system for performing this measurement. Thus the invention is practiced if a fuel-limited horsepower measurement is compared with a full fuel horsepower measurement, in either single accelerations, average multiple accelerations, or plural accelerations including ones used only for air purging, all of which are herein defined to be fully equivalent.

Similarly, although the invention has been shown and described with respect to exemplary embodiments thereof, which utilized an empirically-determined, inertia-related horsepower constant to generate a horsepower related indication for each of the acceleration bursts, it should be obvious by considerations of the invention as described herein that there is no need to perform the multiplying steps of instructions 73 through 78 hereinbefore to each of the readings; it is enough that the relative relationship is horsepower related. And, if desired, the difference in the horsepower-related calculations could be displayed as is, or could alternatively be displayed in horsepower dimensions by multiplying the difference obtained in instruction 98 by the horsepower constant as in instructions 73 and 74 so that the displayed difference, as the measurement, will more accurately reflect horsepower. However, if desired in a simple apparatus, or to reduce time or otherwise simplify the procedure, the empirically-determined horsepower constant, which reflects the inertia of the engine, need not be involved in the calculations.

Also, it should be understood by those skilled in the art that the foregoing and various changes, omissions and additions may be made in an and to the exemplary embodiments herein, without departing from the spirit and the scope of the invention.

Having thus described typical embodiments of our invention, that which we claim as new and desire to secure by Letters Patent of the United States is:

1. Apparatus for providing a measurement of the effective operation of the air/fuel ratio regulator mounted on an internal combustion engine as the engine is caused to undergo successive acceleration bursts from a low speed to a high speed with only its own inertia, drag and accessories as a load, comprising:

speed sensing means, including means adapted to be disposed to sense angular rotation of the engine, for successively providing speed manifestations indicative of the angular speed of the engine;

an interval timer;

control means adapted to be disposed with respect to the air/fuel ratio regulator of the engine under test and said source of pressurized gas for selectively forcing, in response to a signal applied thereto, said air/fuel ratio regulator to provide full fuel to the engine or limited fuel to the engine, alternatively; and     processing means operative with said speed sensing means and said control means disposed with respect to the engine as described hereinbefore, in conjunction with said speed sensing means and said interval timer, for providing an indication related to horsepower for each of said acceleration bursts, said processing means providing a signal to said control means differently during said acceleration bursts to that at least one of said acceleration bursts is accomplished with the air fuel regulator providing full fuel to the engine and at least one other of said acceleration bursts accomplished with said air fuel regulator limiting the fuel to the engine, said processing means comparing the horsepower-related indication generated for a full fuel acceleration burst with a horsepower-related indication generated for an under-fuel-limited acceleration burst and providing a manifestation of the difference thereof, said difference manifestation comprising a measurement of the effective operation of the air/fuel regulator.

2. Apparatus according to claim 1 further comprising: a source of pressurized gas; and wherein said control means comprises:
means adapted for connection between the air inlet of the air/fuel ratio regulator and said source of pressurized gas for selectively connecting, in response to said signal applied thereto, the air/fuel ratio regulator to said source or to substantially atmospheric pressure, alternatively.

3. Apparatus for providing a measurement of the effective operation of the air fuel regulator mounted on an internal combustion engine as the engine is caused to undergo successive acceleration bursts from a low speed to a high speed with only its own inertia, drag and accessories as a load, comprising:
speed sensing means, including means adapted to be disposed to sense angular rotation of the engine, for successively providing speed manifestations indicative of the angular speed of the engine;
an interval timer operative in response to start and stop command input signals applied thereto to commence timing of an interval and to cease timing of said interval, respectively, and to provide an elapsed time manifestation indicative of the interval of time measured thereby;
means for registering a manifestation of an empirically-related horsepower constant;
display means operative in response to alternative corresponding signals to display a low speed indication or a high speed indication;
control means adapted to be disposed with respect to the engine under test to be operable in dependence upon a signal applied thereto, to provide alternative fuel control conditions by forcing the air/fuel ratio regulator to provide either full fuel or limited fuel to the engine during different acceleration bursts; and
processing apparatus operative with said speed sensing means and said control means disposed with respect to the engine as described hereinbefore for defining successive acceleration bursts by providing signals to said display means to cause it to display in interleaved succession low speed indications and high speed indications, for providing, in one of said acceleration bursts following one of said high speed indications, a signal to said signal actuated means to provide one of said fuel control conditions, and, in another acceleration burst following one of said high speed indications, not providing said signal so as to cause the other of said fuel conditions, and, after each occurrence of said high speed indication, providing a start command input signal to said interval timer and registering said measured speed manifestation, and thereafter providing a stop command input signal to said interval timer and registering said measured speed manifestation, and providing, from said measured speed manifestations, indications of the change in speed and the average speed over said time interval, and calculating a horsepower indication related to said speeds and said elapsed time manifestation by said empirically-related horsepower constant, and comparing the horsepower indications derived during a burst with the engine operating under one fuel control condition with the horsepower indications derived during a burst with the engine operating under the other fuel control condition as a measure of the effective operation of the air/fuel ratio regulator of the engine.

4. In the method of measuring the effective operation of the air/fuel ratio regulator mounted on an engine while the engine is loaded only by its own inertia, drag and accessories, the steps of:
accelerating the engine from a low speed to a high speed with the air/fuel ratio regulator forced to provide a full fuel condition and measuring an indication of full fuel horsepower as the engine accelerates;
accelerating the engine from a low speed to a high speed with the air fuel regulator forced to provide minimum fuel to the engine and measuring an indication of fuel-limited horsepower during the acceleration; and
subtracting the fuel-limited horsepower indication from the full-fuel horsepower indication and providing a manifestation of the difference therebetween.

5. The method according to claim 4 wherein the engine is accelerated a plurality of times with the air/fuel ratio regulator forced to supply full fuel to the engine and is accelerated a plurality of times with the air/fuel ratio regulator forced to limit the fuel to the engine and the average of a plurality of full-fuel horsepower indications are compared with the average of a corresponding plurality of fuel-limited horsepower indications.

6. In the method of testing an engine air/fuel ratio regulator while mounted on an internal combustion engine, the steps of:
causing the engine to accelerate under the throttle from a low speed to a high speed with the air/fuel ratio regulator thereof forced to provide full fuel to the engine, while the engine is loaded only with its own inertia, drag and accessories, and measuring an indication of full fuel horsepower demonstrated by the engine during the acceleration thereof;
causing the engine to accelerate under full throttle from a low speed to a high speed with the air/fuel ratio regulator thereof forced to provide limited fuel to the engine, while the engine is loaded only with its own inertia, drag and accessories, and measuring an indication of fuel-limited horsepower demonstrated by the engine during the acceleration thereof; and
subtracting the indication of fuel-limited horsepower from the indication of full fuel horsepower and providing a manifestation of the difference as a measure of effective operation of the air/fuel ratio regulator of the engine.

* * * * *

UNITED STATES PATENT AND TRADEMARK OFFICE
CERTIFICATE OF CORRECTION

PATENT NO. : 4,100,793
DATED : July 18, 1978
INVENTOR(S) : Henry E. Goetsch; James A. Cook; Lee R. Armstrong It is certified that error appears in the above-identified patent and that said Letters Patent are hereby corrected as shown below:

| | |
|---|---|
| Column 1, line 51 | "applied" should read --supplied-- |
| Column 4, line 25 | "useful" should read --usual-- |
| Column 4, line 46 | "of" (second occurrence) should read -- to -- |
| Column 5, line 7 | "one" should read --once-- |
| Column 6, line 52 | "counter" should read --counted-- |
| Column 7, line 9 | "specification" should read --specifications-- |
| Column 7, line 63 | "therein" should read --herein-- |
| Column 8, line 9 | "is" (second occurrence) should read -- to --. |
| Column 8, line 15 | "the inlet" should read --the air inlet-- |
| Column 9, line 49 | "by" should read --be-- |
| Column 10, line 53 | "stated" should read --started-- |
| Column 10, line 63 | "of" should read --if-- |
| Column 11, line 58 | "Then;" should read --Then,-- |
| Column 12, line 36 | "banches" should read --branches-- |
| Column 12, line 55 | "H.P" should read --H.P.-- |
| Column 14, line 38 | "in an and" should read --in and-- |
| Column 15, line 3 | "air fuel" should read --air/fuel-- |

UNITED STATES PATENT AND TRADEMARK OFFICE
CERTIFICATE OF CORRECTION

PATENT NO. : 4,100,793
DATED : July 18, 1978
INVENTOR(S) : Henry E. Goetsch; James A. Cook; Lee R. Armstrong It is certified that error appears in the above-identified patent and that said Letters Patent are hereby corrected as shown below:

```
Column 15, line 5     "air fuel" should read --air/fuel--
Column 15, line 6     "air fuel" should read --air/fuel--
Column 15, line 25    "air fuel" should read --air/fuel--
Column 16, line 47    "the" (second occurrence) should read -- full --
Column 16, line 52    "full fuel" should read --full-fuel--
Column 16, line 63    "full fuel" should read --full-fuel--
```

Signed and Sealed this

Twentieth Day of March 1979

[SEAL]

Attest:

RUTH C. MASON
Attesting Officer

DONALD W. BANNER
Commissioner of Patents and Trademarks